United States Patent [19]
O'Lenick, Jr.

[11] Patent Number: 4,960,845

[45] Date of Patent: Oct. 2, 1990

[54] SULFATED SILICONE POLYMERS

[75] Inventor: Anthony J. O'Lenick, Jr., Lilburn, Ga.

[73] Assignee: Siltech Inc., Norcross, Ga.

[21] Appl. No.: 433,155

[22] Filed: Nov. 8, 1989

[51] Int. Cl.$^5$ .............................................. C08G 77/04
[52] U.S. Cl. ....................................... 528/25; 528/10; 528/29; 528/30; 528/31; 556/450
[58] Field of Search ....................... 528/10, 25, 29, 30, 528/31; 556/450

[56] References Cited

U.S. PATENT DOCUMENTS 4,486,566 12/1984 Nakasuji et al. ...................... 528/30

*Primary Examiner*—Melvyn I. Marquis
*Assistant Examiner*—Karen A. Hellender

[57] ABSTRACT

The invention discloses novel sulfated silicone polymers which have the sulfate group on a pendant functionality rather than within the polymer backbone. Compounds of the invention by virtue of the presence of this anionic group, are high foaming compounds which deposit on the surface of substrates. The deposition can be enhanced by forming complexes with cationic surface active agents. These compounds alter the substrate's surface physical properties providing softness and antistatic properties, but do not exhibit defoaming properties which would minimize their applicability to detergent systems.

5 Claims, No Drawings

SULFATED SILICONE POLYMERS

BACKGROUND OF THE INVENTION

(1) Field of the Invention

The present invention relates to novel sulfated organo-functional silicone polymer compounds which, are high foaming and substantive to various substrate surfaces either alone or as a complex with cationic compounds. The compounds, when applied, provide softness, antistatic properties, lubrication, soil release, and hydrophobicity, without adversely effecting foaming or detergency.

(2) Object of the Invention

One object of the present invention is to provide sulfate functional silicone polymer compounds which are high foaming and substantive to the surface of a fibrous, plastic or cellulosic material. These compounds provide softness, lubricity, and hydrophobicity. Additionally, the compounds of this invention give copious foam alone or in combination with fatty alcohol sulfates of fatty alcohol ether sulfates.

It is another objective of the current invention to provide anionic silicone polymers which can be used in personal care, textile and laundry applications to render antistatic, softness and lubrication to the hair fibers or garments treated. The superior antistatic properties are an important benefit, since this is a major aspect of consumer perception of softness in consumer and industrial laundry applications. Lubrication has been a property which is purported to effect garment life. Application of the compounds of the invention can be from solvent, aqueous dispersion or solution, or applied neat in these processes.

(3) Description of the Prior Art

Fatty alcohol sulfates and fatty alcohol ether sulfates have been known for many years and are the workshoes of the personal care industry. While these materials are excellent detergents they are quite irritating to the skin and eyes. Fatty alcohol sulfates and fatty alcohol ether sulfates are known to strip out the lipids from the skin, hair and many fibers. This results in the need to use conditioners which basically restore lipids to the substrate.

Silicone compounds have been known to be active at the surface of hair, skin, cellulosic and synthetic fibers as well as paper. They are good softeners and lubricants and are very stable to oxidation, however, they have not been used to a great extent in formulated products because of their defoaming properties. Only minimal amounts can be tolerated in a formulation which is intended to foam.

Many attempts have been made to overcome the inability to formulate silicone materials into foaming and detergent systems, to get the softening effect without effecting the foam or detergency. One early approach has been to use hydrosilation technology to make alkoxylated silicone polymers, marketed under the Silwet TM name. Hydrosilation technology is known to those skilled in the art and is outlined in U.S. Pat. No. 4,083,856. These materials are prepared by the hydrosilation of a vinyl alkoxylated alcohol and a silanic hydrogen containing polymer. Because they are alkoxylated, some Silwets and related materials exhibit a high cloud point classically seen in nonionics. Inverse cloud point is the temperature at which the silicone polymer becomes insoluble in water and actually comes out of solution. This inverse cloud point and the insolubility result in appreciable defoaming properties and lack of performance.

THE INVENTION

(1) Summary of the Invention

The present invention relates to novel sulfated silicone polymer which have sulfate pendant funcitonal groups present. These materials provide a high level of foam in aqeous solution by themselves in combination with anionic, cationic or nonionic surface active agents. They also deposit on substrate surfaces and modify the surface. This effect can be maximized by combining the sulfated silicone polymer with more traditional quaternary ammonium compounds. This occurs by virtue of the fact that an anionic/cationic complex forms which deposits on the fiber.

The compounds of this invention having a pendant sulfate group is represented by the following formula;

$$CH_3-\underset{\underset{CH_3}{|}}{\overset{\overset{CH_3}{|}}{Si}}-\left[O-\underset{\underset{R^1}{|}}{\overset{\overset{CH_3}{|}}{Si}}\right]_a\left[O-\underset{\underset{R^2}{|}}{\overset{\overset{CH_3}{|}}{Si}}\right]_b\left[O-\underset{\underset{R^3}{|}}{\overset{\overset{CH_3}{|}}{Si}}\right]_c O-\underset{\underset{CH_3}{|}}{\overset{\overset{CH_3}{|}}{Si}}-CH_3$$

wherein $R^1$ is selected from lower alkyl having one to eight carbon atoms or phenyl.

$R^2$ is $-(CH_2)_3-O-(CH_2-CH_2-O)_x-(CH_2-CH(CH_3)-O)_y-(CH_2-CH_2-O)_z-SO_3^-M^+$

M is a cation needed for charge balance and is selected from Na, K, Li, Nh$_4$, or Ca;

x, y, and z are integers independently ranging from 0 to 100;

$R^3$ is $-(CH_2)_3-O-(CH_2-CH_2-O)_x-(CH_2-CH(CH_3)-O)_y-(CH_2-CH_2-O)_z-H$ a and c are independently integers ranging from 0 to 50;
b is an integer ranging from 1 to 50;

In a preferred embodiment the sulfated silicone polymer conforms to the following structure;

$$CH_3-\underset{\underset{CH_3}{|}}{\overset{\overset{CH_3}{|}}{Si}}-\left[O-\underset{\underset{R^1}{|}}{\overset{\overset{CH_3}{|}}{Si}}\right]_a\left[O-\underset{\underset{R^2}{|}}{\overset{\overset{CH_3}{|}}{Si}}\right]_b\left[O-\underset{\underset{R^3}{|}}{\overset{\overset{CH_3}{|}}{Si}}\right]_c O-\underset{\underset{CH_3}{|}}{\overset{\overset{CH_3}{|}}{Si}}-CH_3$$

wherein;
$R^1$ is lower alkyl having one to eight carbon atoms;
$R^2$ is
$-(CH_2)_3-O-(CH_2-CH_2-O)_x-(CH_2-CH(CH_3)-O)_y-(CH_2-CH_2-O)_z-SO_3^-M^+$ M is a cation needed for charge balance and is selected from NA, K, Li, or NH$_4$;
x, y, and z are integers independently ranging from 0 to 100;
c is 0;
a is an integer ranging from 0 to 50;

b is an integer ranging from 1 to 50.

In another embodiment the sulfated silicone polymer compound which conforms to the following structure;

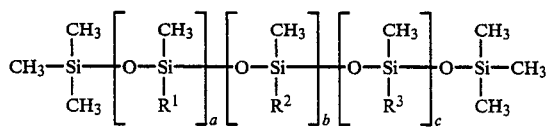

wherein
$R^1$ is phenyl;
$R^2$ is $-(CH_2)_3-O-(CH_2-CH_2-O)_x-(CH_2-CH(CH_3)-O)_y-(CH_2-CH_2-O)_z-SO_3^-M^+$ M is a cation needed for charge balance and is selected from Na, K, Li, or $NH_4$;
x, y, and z are integers independently ranging from 0 to 100;
$R^3$ is $-(CH_2)_3-O-(CH_2-CH_2-O)_x-(CH_2-CH(CH_3)-O)_y-(CH_2-CH_2-O)_z-H$ a and c are indepecndently integers ranging from 0 to 50;
b is an integer ranging from 1 to 50.

In another embodiment x, y, and z are each zero.

As previously mentioned, some of the Silwet Compounds have a hydroxyl group present on a pendant group. These materials are suitable raw materials for sulfonation to give the products of this invention. One method of placing this type of reactive hydroxyl group into the silicone polymer is by the reaction of silanic hydrogen containing polymers with allyl alcohol alkoxylates. These compounds are known to those skilled in the art and are made by alkoxylation of allyl alcohol with ethylene oxide, propylene oxide, butylene oxide or tetrahydrofuran.

Procedures for reacting the allyl alcohol and the silanic hydrogen containing polymer are known to those skilled in the art. U.S. Pat. No. 4,083,856 describe suitable processes.

These hydroxyl functional silicone compounds are subsequently sulfated to make the compounds of the present invention. These type of compounds conform to the following structure;

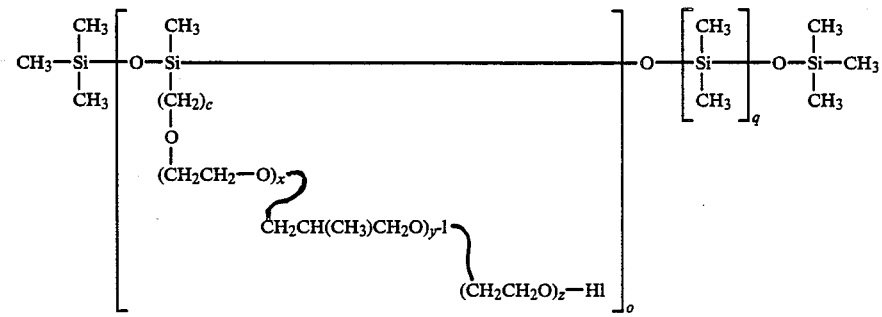

The reaction includes (a) reaction of allyl alcohol with ethylene and propylene oxide using base catalyst (b) hydrosilation of the alkoxylate with a silanic hydrogen containing silicone polymer and (c) sulfation of the resulting hydroxy silicone polymer. It will also be understood that another synthetic route to the compounds of this invention is sulfation of the allyl alcohol alkoxylate followed by hydrosilation into the silanic hydrogen containing backbone.

It is also understood that the sulfation of the hydroxyl group can be complete or partial depending upon the desired properties. The resulting compounds will have some hydroxyl groups and some sulfate groups. A fully sulfated product will be more water soluble, have more foam and be more compatible with other surfactants than will the hydroxy compound used as a starting material for sulfation.

EXAMPLES

Vinyl Intermediate Compounds

Compounds of this class are prepared by alkoxylation of allyl alcohol using methods well known to those skilled in the art. The following are some of the many compounds which can be used to make the products of this invention.

$CH_2=CH-CH_2-O-(CH_2-CH_2-O)_x-(CH_2-CH(CH_3)-O)_y-(CH_2-CH_2-O)_z-H$

| Designation | x | y | z |
|---|---|---|---|
| A | 3 | 0 | 0 |
| B | 9 | 27 | 3 |
| C | 11 | 3 | 0 |
| D | 0 | 20 | 2 |
| E | 20 | 20 | 20 |
| F | 0 | 0 | 0 |
| G | 0 | 10 | 0 |

Preparation of Intermediates

Silicone intermediates of the type used to make the compounds of this invention are well known to those skilled in the art. International Publication (*Silicone Alkylene Oxide Copolymers As Foam Control Agents*) WO 86/0541 by Paul Austin (Sep. 25, 1986) p. 16 (examples 1 to 6) teaches how to make the following intermediates, and is incorporated herein by reference.

Hydrosilation of Intermediates

Silanic Hydrogen Containing Compounds

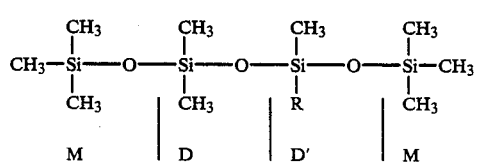

M    D    D'    M

Group Designations

R is H. When the above material is subject to hydrosilation, the D' uni is reacted giving a product which conforms to the following structure;

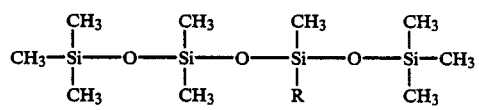

R is

—(CH$_2$)$_3$—O—(CH$_2$—CH$_2$—O)$_x$—(CH$_2$—CH(CH$_3$)—O)$_y$—(CH$_2$—CH$_2$—O)$_z$—H

The hydroxyl group is then sulfated using technology known to those skilled in the art. In another embodiment, the allyl alkoxylate (vinyl intermediate) is sulfated prior to hydrosilation into the polymer backbone.

| Designation | Group Designation |
|---|---|
| H | MD$_{20}$ D'$_{3.2}$ M |
| I | MD$_{160}$ D'$_{5}$ M |
| J | MD$_{20}$ D'$_{10}$ M |
| K | MD$_{40}$ D'$_{6.4}$ M |
| L | MD$_{80}$ D'$_{12.4}$ M |
| M | MD$_{160}$ D'$_{25.6}$ M |

Hydrosilation Compounds

The hydrosilation reaction used to make the compounds of this invention are well known to those skilled in the art. Reference; International Publication (*Silicone Alkylene Oxide Copolymers As Foam Control Agents*) WO 86/0541 by Paul Austin (Sep. 25, 1986) p. 19.

General Procedure

To a 2 liter three necked round bottom flask fitted with a mechanical agitator, thermometer with a Thermo-watch temperature regulator, nitrogen sparge tube vented relfux condenser and heating mantle is added the specified number of grams of Vinyl Intermediate Examples # A to G. Next add the specified number of grams of Silanic Hydrogen Containing Compound Example # H to M and 300 grams of toluene. Heat to 115° C. to azeotropically remove remove any water and 20 ml of toluene. The temperature is reduced to 85° C. and 3.5 ml of 3% H$_2$PtCl$_6$ in ethanol is added. Light is then excluded from the flask by covering it with a black cloth. An exotherm is noted to about 95° C., while the contents are stirred for about 2 hours. During this time silanic hydrogen concentration drops to nil. Cool at 65° C. and slowly add 60 g of sodium bicarbonate. Allow to mix overnight and filter through a 4 micron pad. Distill off any toluene at 100° C. and 1 torr.

| Example | Vinyl Intermediate Example 1 Grams | | Silanic Hydrogen Compound Example 1 Grams | |
|---|---|---|---|---|
| 1 | A | 189.0 | H | 551.0 |
| 2 | B | 2,178.0 | I | 4,831.0 |
| 3 | C | 718.0 | J | 225.0 |
| 4 | D | 1,325.0 | H | 551.0 |
| 5 | E | 2,977.0 | I | 4,831.0 |
| 6 | F | 57.0 | J | 225.0 |
| 7 | G | 647.0 | H | 551.0 |
| 8 | A | 189.0 | I | 4,831.0 |
| 9 | B | 2,178.0 | J | 225.0 |
| 10 | C | 718.0 | H | 551.0 |
| 11 | D | 1,325.0 | I | 4,831.0 |
| 12 | E | 2,977.0 | J | 225.0 |
| 13 | F | 57.0 | H | 551.0 |
| 14 | G | 647.0 | I | 4,831.0 |

Sulfation of the hydroxy silicone polymer

Chlorosulfonic Acid

EXAMPLES 15-28

Add the specified amount of the hydroxy silicone compound (examples 1-14) to a suitable reaction flask. The flask should be equipped with thermometer, a tube through which nitrogen can be introduced (a sparge tube) and have capabilities to be attached to a vacuum. After adding the hydroxy silicone compound, the flask is submerged into a bath of ice water. Begin adding 117.0 grams of chlorosulfonic acid using a slight vacuum. The addition is very exothermic and the rate of addition is regulated by the cooling rate (i.e. keeping the temperature below 30° C.) and removal of HCl is generated as a by-product. After all the chlorosulfonic acid has been added increase the vacuum until all bubbling ceases. Release vacuum.

Prepare a neutralization solution by mixing 40.0 grams of sodium hydroxide in 1,000 grams of water. Slowly add the chlorosulfonic acid/alcohol adduct to the neutralization solution under good agitation. After all the adduct is added, adjust the pH to 7.0 with either sodium hydroxide or citric acid. The product is an aqueous solution of the products of this invention and is used without any additional purification.

| Example | Hydroxy Example # | Silicone Grams |
|---|---|---|
| 15 | 1 | 740.0 |
| 16 | 2 | 7,009.0 |
| 17 | 3 | 943.0 |
| 18 | 4 | 1,876.0 |
| 19 | 5 | 7,828.0 |
| 20 | 6 | 282.0 |
| 21 | 7 | 1,198.0 |
| 22 | 8 | 5,020.0 |
| 23 | 9 | 2,404.0 |
| 24 | 10 | 1,269.0 |
| 25 | 11 | 6,156.0 |
| 26 | 12 | 3,222.0 |
| 27 | 13 | 608.0 |
| 28 | 14 | 5,478.0 |

Sulfation Sulfamic Acid

EXAMPLES 29-42

Add the specified amount of hydroxy silicone compound (examples 1-14) to a suitable reaction flask. The flask should be equipped with a thermometer, a tube through which nitrogen can be bubbled (a sparge tube) and have the capabilities to be attached to a vacuum system. Add 0.5 grams of urea while introducing nitrogen though the tube.

Next, 119.0 grams sulfanic acid are added under good agitation. The reaction mass is then heated to 90°-95° C. for 30-60 minutes. An exotherm will occur during this time. Keep the temperature below 125° C. by using cooling water. Hold for 5-8 hours at 115°-125° C. Add 1,000 grams of water, keeping the pH above 7.0. Ammonia water can be used to adjust the pH.

The product is used without additional purification.

| Example | Hydroxy Example # | Silicone Grams |
|---------|-------------------|----------------|
| 29 | 1 | 740.0 |
| 30 | 2 | 7,009.0 |
| 31 | 3 | 943.0 |
| 32 | 4 | 1,876.0 |
| 33 | 5 | 7,828.0 |
| 34 | 6 | 282.0 |
| 35 | 7 | 1,198.0 |
| 36 | 8 | 5,020.0 |
| 37 | 9 | 2,404.0 |
| 38 | 10 | 1,269.0 |
| 39 | 11 | 6,156.0 |
| 40 | 12 | 3,222.0 |
| 41 | 13 | 608.0 |
| 42 | 14 | 5,478.0 |

Applications Evaluation

Foam

The compounds of the invention were found to be excellent foamers when compared to the hydroxy compounds. The foam is dense and copious.

Test Method

1% surfactant 50 ml shaken in a graduated cylinder

| Results Example | Type | Foam (in ml) Initial | 5 Min |
|-----------------|------|----------------------|-------|
| 1 | Hydroxyl | 119 | 27 |
| 3 | Hydroxyl | 87 | 40 |
| 13 | Hydroxyl | 77 | 34 |
| 29 | Sulfate | 188 | 98 |
| 39 | Sulfate | 150 | 87 |
| 41 | Sulfate | 176 | 100 |

Alkaline Stability

The compounds of the present invention were also found to have excellent stability in alkaline environments while the hydroxy materials were degraded in 10% sodium hydroxide.

| Example | Type | Stability 1% in 10% NaOH |
|---------|------|--------------------------|
| 1 | Hydroxyl | Split in one day |
| 3 | Hydroxyl | Split in one day |
| 13 | Hydroxyl | Split in one day |
| 29 | Sulfate | Stable over 1 month |
| 39 | Sulfate | Stable over 1 month |
| 41 | Sulfate | Stable over 1 month |

What is claimed:

1. A sulfated silicone polymer compound which conforms to the following structure;

$$CH_3-\underset{\underset{CH_3}{|}}{\overset{\overset{CH_3}{|}}{Si}}-\left[O-\underset{\underset{R^1}{|}}{\overset{\overset{CH_3}{|}}{Si}}\right]_a\left[O-\underset{\underset{R^2}{|}}{\overset{\overset{CH_3}{|}}{Si}}\right]_b\left[O-\underset{\underset{R^3}{|}}{\overset{\overset{CH_3}{|}}{Si}}\right]_c O-\underset{\underset{CH_3}{|}}{\overset{\overset{CH_3}{|}}{Si}}-CH_3$$

wherein $R^1$ is selected from lower alkyl having one to eight carbon atoms or phenyl;

$R^2$ is $-(CH_2)_3-O-(CH_2-CH_2-O)_x-(CH_2-CH(CH_3)-O)_y-(CH_2-CH_2-O)_z-SO_3^-M^+$

M is a cation needed for charge balance and is selected from Na, K, Li, or NH$_4$, x, y, and z are integers independently ranging from 0 to 100;

$R^3$ is $-(CH_2)_3-O-(CH_2-CH_2-O)_x-(CH_2-CH(CH_3)-O)_y-(CH_2-CH_2-O)_z-H$ a and c are independently integers ranging from 0 to 50;

b is an integer ranging from 1 to 50.

2. A compound of claim 1 wherein $R^1$ is methyl.

3. A compound of claim 1 wherein x, y, and z are each zero.

4. A sulfated silicone polymer compound which conforms to the following structure;

$$CH_3-\underset{\underset{CH_3}{|}}{\overset{\overset{CH_3}{|}}{Si}}-\left[O-\underset{\underset{R^1}{|}}{\overset{\overset{CH_3}{|}}{Si}}\right]_a\left[O-\underset{\underset{R^2}{|}}{\overset{\overset{CH_3}{|}}{Si}}\right]_b\left[O-\underset{\underset{R^3}{|}}{\overset{\overset{CH_3}{|}}{Si}}\right]_c O-\underset{\underset{CH_3}{|}}{\overset{\overset{CH_3}{|}}{Si}}-CH_3$$

wherein;

$R^1$ is lower alkyl having one to eight carbon atoms;

$R^2$ is $-(CH_2)_3-O-(CH_2-CH_2-O)_x-(CH_2-CH(CH_3)-O)_y-(CH_2-CH_2-O)_z-SO_3^-M^+$

M is a cation needed for charge balance and is selected from Na, K, Li, or NH$_4$;

x, y, and z are integers independently ranging from 0 to 100;

c is 0;

a is an integer ranging from 0 to 50;

b is an integer ranging from 1 to 50.

5. A sulfated silicone polymer compound which conforms to the following structure;

$$CH_3-\underset{\underset{CH_3}{|}}{\overset{\overset{CH_3}{|}}{Si}}-\left[O-\underset{\underset{R^1}{|}}{\overset{\overset{CH_3}{|}}{Si}}\right]_a\left[O-\underset{\underset{R^2}{|}}{\overset{\overset{CH_3}{|}}{Si}}\right]_b\left[O-\underset{\underset{R^3}{|}}{\overset{\overset{CH_3}{|}}{Si}}\right]_c O-\underset{\underset{CH_3}{|}}{\overset{\overset{CH_3}{|}}{Si}}-CH_3$$

wherein $R^1$ is phenyl;

$R^2$ is $-(CH_2)_3-O-(CH_2-CH_2-O)_x-(CH_2-CH(CH_3)-O)_y-(CH_2-CH_2-O)_z-SO_3^- M^+$

M is a cation needed for charge balance and is selected from Na, K, Li, or NH$_4$;

x, y, and z are integers independently ranging from 0 to 100;

$R^3$ is $-(CH_2)_3-O-(CH_2-CH_2-O)_x-(CH_2-CH(CH_3)-O)_y-(CH_2-CH_2-O)_z-H$ a and c are independently integers ranging from 0 to 50;
b is an integer ranging from 1 to 50.

* * * * *